United States Patent
Worden

[11] 3,860,743
[45] Jan. 14, 1975

[54] CABLE SPLICE HOUSING

[76] Inventor: Owen Winram Worden, 2809 Uplands Cres., Abbotsford, British Columbia, Canada

[22] Filed: Oct. 19, 1972

[21] Appl. No.: 298,914

[30] Foreign Application Priority Data
Apr. 14, 1972  Canada .............................. 139691

[52] U.S. Cl. ........................ 174/93, 174/21, 174/77
[51] Int. Cl. ............................................. H02g 15/08
[58] Field of Search ............................ 174/91–93, 174/77 R, 76, 138 F, 21 R; 339/203, 211, 213, 208, 209

[56] References Cited
UNITED STATES PATENTS
| | | | |
|---|---|---|---|
| 3,054,847 | 9/1962 | Colbert | 174/93 X |
| 3,209,069 | 9/1965 | Ruddell et al. | 174/91 X |
| 3,705,950 | 12/1972 | Jirka et al. | 174/93 X |

*Primary Examiner*—Darrell L. Clay
*Attorney, Agent, or Firm*—Ladas, Parry, Von Gehr, Goldsmith & Deschamps

[57] ABSTRACT

A cable splice housing has a central section with an internal diameter larger than the diameter of the cables to be spliced. A pair of end closure members provide a seal between the ends of the central section and its cables. At least one of the closure members is adapted for threaded engagement with one end of the central section and has an opening for accommodating one of the cables, a tube portion being sealed to that closure member around the opening and being clamped in a sealed manner around that cable. The other closure member may also be in threaded engagement with the other end of the central section or may be clamped at one end to the central section.

2 Claims, 3 Drawing Figures

CABLE SPLICE HOUSING

The present invention relates to cable splice housings for use with electrical cables.

The cable splice housings to which the invention relates are particularly useful for use with the multicore cables such as telephone cables, and may also be used in some case for enclosing splices in power carrying cables.

To provide a cable splice with suitable mechanical protection and electrical insulation, and to protect the splice from moisture, it has in the past been common to encase the splice in a metal splice box filled with a solidified electrical insulator. This arrangement has the disadvantage that it is not readily possible to gain access to the spliced able for the purposes of testing, altering or otherwise working on the splices without damaging the box.

It is accordingly an object of the present invention to provide an improved cable splice housing which can be readily and inexpensively manufactured and which, in use, can be readily opened to allow access to a cable splice normally disposed within the housing and can then be readily replaced and resealed around the splice.

According to the present invention, a cable splice housing comprises: a central section having an internal diameter larger than the diameter of the cables to be spliced; a closure member having an opening for accommodating a cable therethrough; said closure member having threaded means shaped for threaded engagement with corresponding threaded means on one end of said central section; said closure member being provided with a flexible tube portion sealed thereto around said opening; means for clamping the tube portion in sealed relation around the cable to seal the closure member to the cable; and said central section. The closure member and the tube portion may be of suitable plastic material.

The invention will be more readily understood from the following description of embodiments thereof given by way of example with reference to the accompanying drawings in which.

Figure 1:
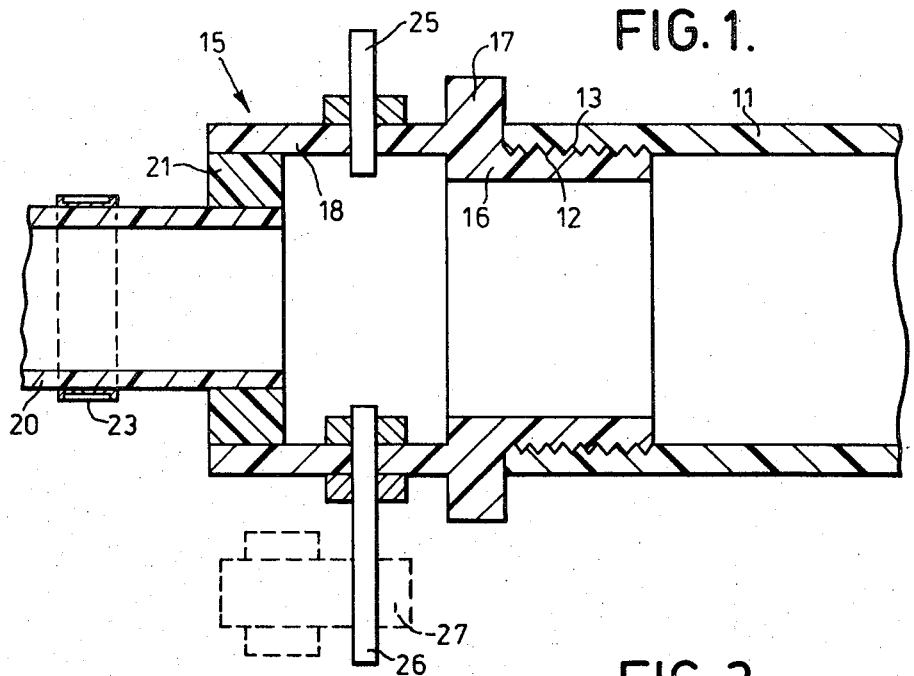
FIG. 1 shows a view taken in longitudinal section through one end of a cable splice housing.

Referring firstly to FIG. 1, there are shown portions of a cable splice housing for use e.g. in enclosing splices in multicore telephone cables.

The housing, which is indicated generally by reference numeral 10, has a control section 11 which comprises a length of standard plastic tubing.

The left hand end of the central section 11, as viewed in FIG. 1, is formed with an internal thread 12, which is in threaded engagement with an external thread 13 on a closure member indicated generally by reference numeral 15.

The closure member 15 has at its right hand end, as viewed in FIG. 1, a cylindrical portion 16, on the external periphery of which the screw thread 13 is formed, and which is inserted into the end of the central section 11 in threaded engagement therewith.

The cylindrical portion 16 is provided with an annular, externally projecting peripheral portion 17 which forms a seat for the end of the central section 11.

The periphoeral portion 17 mergers into a further cylindrical portion 18, which extends to the left hand end of the closure member 15 as viewed in FIG. 1.

The end of a tube portion or pipe 20 projects into this end of the closure member 15, and an annular plug 21 is disposed between the end of the pipe 20 and the cylindrical portion 18 and is securely and sealingly fixed to the pipe 20 and the cylindrical portion 18 by adhesive.

The central opening of the annular plug 21 accommodates a cable (not shown) extending through the pipe 20 and the closure member 15 for splicing to another cable (not shown) within the central section 11.

By means of a stainless steel clamp 23 extending around the pipe 20, the pipe 20 may be securely clamped, and thereby sealed, against the exterior of the cable extending through the pipe 20.

The stainless steel clamp 23 is a standard hose clamp having a width of about one half of one inch and provided with a worm screw tightening device engaging spots in the strip or the clamp.

The closure member 15 is provided with an air valve 25 for use in removing air from the interior of the cable splice housing or replacing the air in the cable splice housing by an inert gas. The air valve 25 may also be employed to provide the cable splice housing with an internal pressure higher than that of the ambient atmosphere to ensure that any leakage which occurs is outwardly from the cable splice housing rather than from the exterior to the interior thereof.

The closure member 15 is also penetrated by a ground connection 26, which may be connected to a ground conductor such as that indicated by reference numeral 27.

Figure 2:
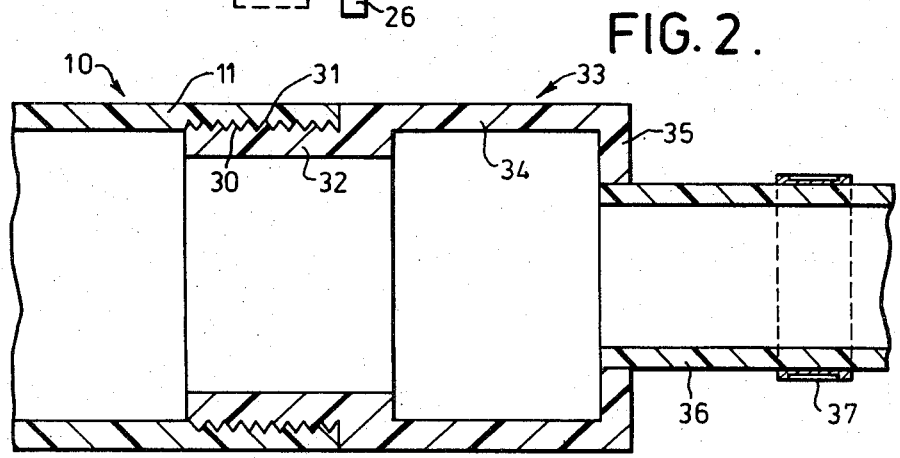
FIg. 2 shows a view taken in longitudinal section through the other end of the cable splice housing of FIG. 1.

As shown in FIG. 2, the other end of the section 11 is formed with an internal screw thread 30, which is in engagement with an external screw thread 31 on a cylindrical portion 32 forming one end of a closure member indicated generally by reference numeral 33.

The cylindrical portion 32 mergers into another cylindrical portion 34 having a slightly larger internal diameter than the cylindrical portion 32.

The cylindrical portion 34 is provided at its right hand end, as viewed in FIG. 2, with an annular, inwardly projecting end portion 35 having a central opening in which one end of a tube portion or pipe 36 is secured by an adhesive.

The pipe 36, through which a cable (not shown) extends into the right hand end of the cable splice housing 10, is provided with a stainless steel clamp 37 similar to the stainless steel clamp 23 for clamping and thereby sealing the pipe 36 to this cable.

It will be apparent from the above description of the cable splice housing that it can be readily assembled over the cable splice and also that it can be readily withdrawn from the splice to allow work to be done on the splice. Thus, for example, to remove the housing, or at least the central section 11 thereof, from the splice, it is sufficient to release one of the stainless steel clamps 23 and 37, and prefrably the latter to avoid disturbing the ground connection, and then to unscrew the closure members 15 and 33 from the central section 11 so that the latter can be slid along one of the cables to provide access to the splice.

Figure 3:
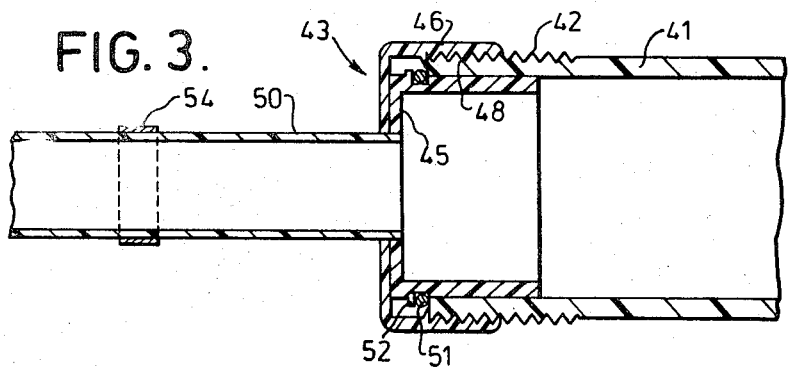
FIG. 3 shows a view taken in longitudinal section through one end of a different cable splice housing.

In the embodiment of the invention illustrated in FIG. 3, a central section 41 of a cable splice housing is formed from a standard length of pipe provided on the exterior of the pipe at one end thereof with a screw thread 42.

A double-walled closure member indicated generally by reference numeral 43 is fitted over the end of the central section 41.

The closure member 43 is formed by an inner cup-shaped member, which comprises an inner cylindrical portion 44 and an inner flat annular portion 45, and an outer cup-shaped member which comprises an outer cylindrical portion 46 and an outer flat annular portion 47.

The outer cylindrical portion 46 is formed, on its interior surface, with a screw thread 48 which, as can be seen from FIG. 3, is in further threaded engagement with the screw thread 42 on the exterior of the end of the central section 41 of the cable splice housing.

The inner and outer cup-shape members are secured together by adhesive, and each has a central opening in which one end of a tube portion or pipe 50 is secured by adhesive.

The outer surface of the inner cylindrical portion 44 is provided with recesses for receiving a resilient sealing ring 51 and a split steel washer 52, both of which project from the outer surface of the inner cylindrical portion 44.

The split steel washer 52, which is provided on the left hand side of the sealing ring 51 as viewed in FIG. 3, serves to provide an annular seat for the sealing ring 51, which when the cable splice housing is assembled, is axially compressed by the end of the central section 41 and forms a seal between the end of the central section 41 and the cylindrical portion 44 of the inner cup-shaped member forming part of the closure member 43.

The pipe 50 is clamped and sealed to a cable extending therethrough (not shown) by a stainless steel clamp 54.

A similar arrangement is provided at the other end (not shown) of the central section 41.

The above-described arrangement illustrated in FIG. 3 can be readily assembled around and dismantled from a splice by tightening or loosening, as the case may be, the stainless steel clamp 54 and the screw thread engagement of the closure member 43 and the end of the central section 41.

It has been demonstrated above that the method aspect of the present invention broadly includes the steps of a cable splice housing, comprising: a central section having an internal diameter larger than the diameter of the cables to be spliced; a closure member having an opening for accommodating a cable therethrough; said closure member having threaded means shaped for threaded engagement with corresponding threaded means on one end of said central section; said closure member being provided with flexible tube portions sealed thereto around said opening; means for clamping the tube portion in sealed relation around the cable to seal the closure member to the cable; a tubular closure member clamped at one end thereof to the other end of the central section, and tapering towards the other end of said tubular closure member; and means for clamping said other end of said tubular closure member in sealed relation around another cable to seal said other end of the central section to the other cable; said central section, said closure members and said tube portion being of plastic material. The method additionally includes the steps of clamping into position said end portion of said cable so as to inhibit relative movement between the cable and the tube.

The method also envisages clamping the end portion of said cable in clamped position so as to inhibit relative movement between said cable and said tube.

It will be apparent from the foregoing that the cable splice housing and method of splicing disclosed and taught herein represents a further advance in the art which will be of benefit to the public and industry generally.

I claim:
1. A cable splice housing, comprising:
   a. a central section having an internal diameter larger than the diameter of the cables to be spliced;
   b. a closure member having an opening for accommodating a cable therethrough;
   c. said closure member threadedly engaged with corresponding threaded means on one end of said central section;
   d. said closure member being provided with a flexible tube portion sealed thereto around said opening;
   e. means for clamping the tube portion in sealed relation around the cable to seal the closure member to the cable;
   f. said closure member having an externally projecting annular flange in abutment with the end of the central section; and
   g. an annular plastic plug provided between and sealed to one end of the tube portion and one end of the closure member, the central opening of said annular plug constituting said opening for accommodating the cable.

2. The cable splice housing of claim 1, wherein the threaded means of the closure member comprise an external screw thread, and the threaded means of the central section comprise an internal thread.

* * * * *